United States Patent [19]
Haschke et al.

[11] 3,853,781
[45] Dec. 10, 1974

[54] WASHING AND CLEANSING COMPOSITION

[75] Inventors: Heinz Haschke; Peter Kuzel, both of Grossauheim; Erich Bader, Hanau; Horst Kruger, Darmstadt; Emil Kerschner, Freigericht; Arnold Hufnagel, Bischofsheim, all of Germany

[73] Assignee: Deutsche Gold-und Silber-Scheideanstalt vormals Roessler, Frankfurt/Main, Germany

[22] Filed: Jan. 17, 1973

[21] Appl. No.: 324,422

Related U.S. Application Data

[63] Continuation-in-part of Ser. No. 97,482, Dec. 10, 1970, abandoned, and a continuation-in-part of Ser. No. 145,974, May 24, 1971, abandoned.

[30] Foreign Application Priority Data

Dec. 11, 1969 Germany.............................. 1962125
May 23, 1970 Germany.............................. 2025238

[52] U.S. Cl...................... 252/132, 252/89, 252/99, 252/531, 252/535, 252/539, 252/540, 252/541, 252/DIG. 12, 252/DIG. 15
[51] Int. Cl............................................. C11d 9/26
[58] Field of Search ........ 252/89, 99, 132, DIG. 12, 252/DIG. 15

[56] References Cited
UNITED STATES PATENTS

| | | | |
|---|---|---|---|
| 2,264,103 | 11/1941 | Tucker et al. ................ | 252/DIG. 15 |
| 3,284,364 | 11/1966 | Siegele................... | 252/132 |
| 3,308,067 | 3/1967 | Diehl ................... | 252/161 |

*Primary Examiner*—Leland A. Sebastian
*Attorney, Agent, or Firm*—Michael S. Striker

[57] ABSTRACT

The builder compound in a washing composition or detergent consists at least in part of linear or cross-linked polymer or salt thereof which polymer in the main chain has predominantly carbon-to-carbon bonds and wherein the units predominantly have the formulae

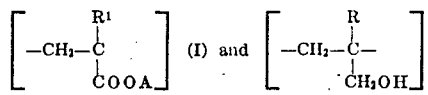

and wherein a minor amount, relative to the amount of units (I) and (II), of units of the type

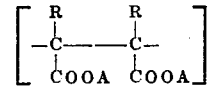

may be present and wherein R and $R^1$ are the same or different and are alkyl having 1 to 6 carbon atoms or hydrogen and wherein $R^1$ may also be chlorine and wherein A is hydrogen or one valence of a monovalent or polyvalent metal or is ammonium, the said units I, II and IV being arranged in random sequence and the average frequency of the units being such as to provide for a ratio of carboxyl or carboxylate groups to hydroxyl groups between 1.1 and 16 and the minimum degree of polymerization being 3, the said polymers being obtained by oxidative polymerization of acrolein or oxidative copolymerization of ($a$) acrolein with ($b$) acrylic acid, an alkyl acrylic acid, a halogenoacrylic acid or an unsaturated polycarboxylic acid.

14 Claims, No Drawings

WASHING AND CLEANSING COMPOSITION

CROSS REFERENCES TO RELATED APPLICATIONS

This application is a continuation-in-part application of applications Ser. No. 97,482 filed Dec. 10, 1970, now abandoned, and Ser. No. 145,974 filed May 24, 1971, now abandoned.

BACKGROUND OF THE INVENTION

Modern washing compositions, particularly detergents, no matter whether they are in liquid, pasty or solid form, contain compounds which have a cleaning or bleaching effect, such as non-ionic, anionic or hybrid ionic synthetic detergents, and they usually also contain oxygen-furnishing bleaching agents and other components such as neutral salts, optical brighteners, inhibitors of graying tendencies, foam-suppressing agents, enzymes, etc.

A further, quite essential component of modern detergents are the usually inorganic so-called "builder salts." A particularly important role as builders is played by the phosphates for the purpose of preventing encrustations of textiles (ash formation) and in improving the soil release, emulsifying and suspension-forming properties. They also increase the washing activity of synthetic crude detergents and the stabilization of activated oxygen by combining with heavy-metal ions and have an effect on the surface tension, foaming properties, foam stability, as well as corrosion properties and, generally, are helpful in controlling the pH of the composition.

Examples of such compounds are in particular the condensated phosphates, such as diphosphates (pyrophosphates), triphosphates, e.g., tripolyphosphate, tetraphosphates as well as the long-chain polyphosphates (Graham's salt, hexametaphosphate). These compounds are used in the form of their neutral or acid sodium, potassium or ammonium salts. Sodium tripolyphosphate and mixtures containing the same are preferably employed for these purposes.

The phosphates may also be replaced by phosphorus or nitrogen-containing organic complexing agents. In this class belong for instance the alkali metal or ammonium salt of the aminopolycarboxylic acids such as nitrilotriacetic acid and ethylene diaminotetraacetic acid. Further builder salts are the silicates, particularly sodium silicates, in which the ratio of $Na_2O : SiO_2$ is from 1 : 3.5 to 1 : 1.

Not all of the above properties are equally present in all of the phosphates. Sodium tripolyphosphate, for instance, does not have the optimum effect in every respect but occupies a position somewhat above average. However, since it combines numerous desirable properties, it is presently the preferred phosphate in washing agents. Thus household detergents may, for instance, contain about 25 to 33 percent of sodium tripolyphosphate (calculated as $Na_5P_3O_{10}$) with a total $P_2O_5$ content between 21 and 25 percent. In addition, there may be present between 7 and 15% sodium pyrophosphate (as $Na_3P_2O_7$) and about 2% orthophosphate (as Na PO) while the pyrophosphate is probably predominantly formed from the tripolyphosphate by degradation during the manufacture of the detergent.

The use of all these materials, however, involves certain undesirable features. Particularly, difficulties arise with nitrogen, phosphorus or sulfur-containing compounds since they result in an uncontrolled algae growth in sewage waters. Polyphosphate is usually considered the cause of the excessive phosphate contents of our rivers and lakes and thus of the upset in the biological balance of life in the water.

The sodium polyphosphate furthermore has a tendency to hydrolize so as to form compounds such as pyro- and orthophosphates which have a lower complexing property and thus cause undesirable precipitation. In many cases a corrosion effect on metals such as aluminum has been observed.

It has also been proposed, as already indicated, to replace the phosphates by complexing agents of the amino-carboxylic acid type, for instance nitrilotriacetic acid. However, there are strict limits for the use of these latter materials in washing, bleaching and cleaning compositions which contain oxygen-furnishing bleaching agents since they lose their activity either completely or partly because of their tendency to oxidize.

It is therefore an object of the present invention to provide for a washing agent containing a builder compound which avoids all these shortcomings and in particular does not contain nutrients for aminoorganisms and specifically is free of phosphorus contents.

SUMMARY OF THE INVENTION

The invention resides in a washing, bleaching or cleansing composition which comprises a surfactive agent or soap and a builder compound and, in addition, may contain a diluent, a bleaching agent or carboxymethyl cellulose, and wherein the builder compound comprises a linear or cross-linked polymer which in the individual units contains carboxylic acid or carboxylate and hydroxyl groups and which in the main chain has predominantly carbon-to-carbon bonds and which has a ratio of carboxyl or carboxylate groups to hydroxyl groups between 1.1 and 16 minimum degree of polymerization of 3.

DETAILS OF THE INVENTION AND PREFERRED EMBODIMENTS

Preferably, the ratio between carboxyl or carboxylate groups to hydroxyl groups is between 2 and 9, and the degree of polymerization is between 3 and 600.

The compounds of the invention are free of nitrogen, phosphorus and sulfur, and therefore do not give rise to the sewage problems in spite of at least equal activity of the washing, bleaching and cleansing agent itself. They are furthermore not subject to oxidation under the conditions of use.

BUILDER COMPOUNDS

The principal feature of the compositions of the invention are the carboxylic acid polymers used as builder compounds.

The polymers may be made by copolymerization of acrolein, acrylic acids or substitute acrylic acids in the presence of free radicals catalysts or redox catalysts, followed by a Cannizzaro reaction. They can also be obtained, for instance, by copolymerization of, if desired, substituted, acrylic acids with allyl alcohol, or by saponification of copolymers of acrylic acid ester and esters of vinyl alcohols or their derivatives such as acrylonitrile.

The polymers may also be made by oxidation of copolymers of acrolein with allyl acrylate or its derivatives or with vinyl alcohol derivatives. Also, a cyclo-polymerization of allyl acrylate or a cyclo-copolymerization of allyl acrylate with acrylic acids upon simultaneous saponification and, furthermore, an oxidation of polyacrolein homo- or copolymerizates is possible. All types of polymerization methods may be used, such as precipitation-, bulk- or solution-polymerization.

Preferred in the present invention are polymers in which there are present carboxyl- or preferably carboxylate groups, as well as hydroxyl groups and which may also include side-chain located vinyl- or carboxyl groups. The polymers may be linear or cross-linked and have a main chain predominantly consisting of carbon-to-carbon bonds, in which all, or the major part of the units have the formulae

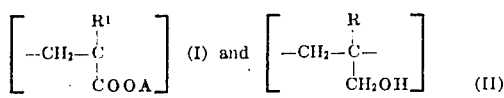

In addition, there may be a minor amount, relative to the numver of the units (I) and (II), of units of the formula

A in these formulae is hydrogen or preferably is a valence of a mono- or polyvalent metal, particularly of an alkali metal, and preferably sodium, or is ammonium. R and $R^1$ are the same or different and are alkyl of 1–6 carbon atoms, particularly methyl, or, preferably, are hydrogen. In addition, $R^1$ may also be halogen, particularly chlorine. The units (I), (II), and (IV) may follow each other in random sequence, but the average frequency of these units in the polymer, even through one or several of the units may not be present, must provide a ratio of carboxyl or carboxylate groups to hydroxyl groups above 0.5 particularly between 1.1 and 16, and preferably between 2 and 9. The minimum degree of polymerization, furthermore, must be 3, and more particularly should be between 3 and 5,000, and preferably between 3 and 600.

The polymers may generally be made as indicated above.

The preferred way, however, of making the polymers is by oxidative polymerization of acrolein and subsequent treatment of the polymerizate with a strong base, particularly with an alkali hydroxide according to the Cannizzaro method. The treatment with the strong base, in a less preferred variant, may also be effected upon simultaneous condensation with formaldehyde. There are then obtained polymers which additionally have units of the formulae.

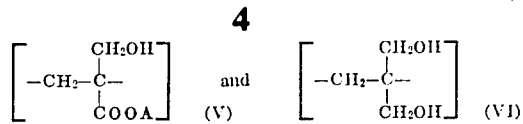

which latter two units should be present in minor amounts relative to the units identified as (I) and (II).

In all cases, it is necessary to select the polymerization and reaction conditions, and in particular the amount of the oxidizing agent, in such a manner that the ratio of carboxyl or carboxylate groups to hydroxyl groups in the final product is as defined above and that the minimum degree of polymerization is 3. In other words, there must simultaneously be present the required number of units (I) and (II) and possibly (IV).

As oxidation agents, peroxides or peracids may be used. Preferred is the oxidation with $H_2O_2$. In case of the oxidation polymerization, it is possible to adjust the ratio of carboxyl to carbonyl groups by the ratio of oxidizing agent to amount of acrolein. The higher this ratio, the larger will be the number of carboxyl groups in the final polymer, and conversely. Since the peroxide compound also acts as chain-regulating agent, it will be understood that the degree of polymerization can be controlled also by the amount of oxidizing agent. The degree of polymerization decreases with an increasing amount of oxidizing agent and conversely. For instance, with a ratio of $H_2O_2$ to acrolein of 1 : 1, it is possible to obtain an average polymerization degree of 3.2 and COOA/C=O- ratio of 5 : 1. On the other hand, if under otherwise the same conditions, The ratio employed is 0.7 : 1, the degree of polymerization will be 13 and the ratio between carboxyl groups and C—O groups will be 3.2 : 1.

The oxidation polymerization of the acrolein can also be carried out in the presence of other copolymerizable monomers in virtually any desired amounts. The use of acrylic acid as comonomer is preferred since this will directly influence the content of carboxyl groups in the polymer. Besides, the acrylic acid content in the starting product also effects the degree of polymerization in that this degree increases with the contents of acrylic acid.

Examples of other copolymerizable monomers are: alkylacrylic acids, halogeno-acrylic acids, unsaturated polycarboxylic acids, particularly maleic acid, and derivatives thereof such as esters and nitrilies; furthermore, vinyl alcohol derivatives, allyl alcohols and derivatives of the latter, etc.

The homo- or copolymerization of the acrolein can be carried out, depending on the desired contents of carboxyl groups in the final polymer, both in solution and as precipitation polymerization, preferably in an aqueous medium. If peroxy compounds are used as oxidation agents, it is preferred, first, to introduce these compounds and, if desired, the comonomer or a part thereof into an aqueous solution or suspension, and to add the acrolein and, if desired, the residual comonomer only at an increased temperature of, for instance, between 50° and 100°C.

In case of a solution polymerization, the polymers obtained can be used, if desired, directly for further reactions, preferably after concentration of the solution. It is advisable in this case to destroy any residual amounts of oxidizing agent that may be present in the solution, for instance by addition of small amounts of $MnO_2$ or activated carbon. It is, however, also possible to precipitate the solution polymers from the mass by means of a dilute acid, for instance hydrochloric acid. The monomers can be recovered, for instance, by distillation directly from the reaction mass. The distillation residue in this case constitutes a highly concentrated, aqueous solution of the polymer which can be used for further reaction.

It is, however, also possible to carry the distillation up to dryness and thus to obtain the pure polymer of solid form.

If the polymerization is carried out as precipitation polymerization, it is easy to separate the polymers by filtration. The residual monomers in the filtrate can then be used for other purposes in the form in which they are present in the filtrate. The precipitation polymer can be purified with water or, if desired, by passing air therethrough.

The thus-obtained polyaldehydeo-carboxylic acids can be further reacted in an aqueous solution or suspension with a strong base, in the presence of formaldehyde if desired. This can be carried out by using the formaldehyde in about the stoichiometric amount relative to the aldehyde groups which are present in the polymer and by stirring for an extended period of time at room temperature or at an elevated temperature up to about 100°C. After 2 hours, the yield is already about 60 – 70 percent. Within 24 hours it increases to 90 – 100 percent.

The reaction in solution results in solutions containing the salts of the polyhydroxycarboxylic acids, in addition to an excess of base. They can be concentrated by evaporation to dryness. The thus-obtained salt can be used directly as builder agent. By precipitation from the reaction mass, for instance with methanol, the salts are obtained in great purity. However, the solution may also be neutralized prior to evaporation with a dilute acid, such as hydrochloric acid, or the free acids may be precipitated. Likewise, the course of the Cannizzaro reaction may be controlled in a manner that eventually virtually neutral salt solutions are obtained. This can be accomplished by selecting the amount of added base to cause the excess base to decrease with continuing reaction, and finally, at exactly the end of the reaction, to reach zero.

The neutralization of the excess base preferably is carried out with acids of which the salts do not interfere with the use of the polymers as builder salts, such as in the case where $CO_2$ is present. Preferably the neutralization is affected, with the polyhydroxycarboxylic acids themselves in their pure solid form. Thus pure neutral solutions are obtained of the salts of the polyhydroxycarboxylic acids from which the acids can easily be isolated by evaporation of the water. The polyhydroxycarboxylic acids used for the neutralization may for instance be precipitation polymers which are obtained in the manner described above. They can easily be precipitated with dilute acids from the solution resulting from the reaction with the base and, if desired, in the presence of formaldehyde.

The polymers of the invention, as already pointed out, predominantly have carbon-to-carbon bonds in the main chain and can be linear or cross-linked.

When acrolein is used as the starting product, with or without acrylic acid, the polymers consist predominantly of the above-identified units (I) and (II). These units are the principal constituents of the carbon-to-carbon main chain and are in part formed when the polyaldehydro-carboxylic acid is subjected to the Cannizzaro reaction. In this reaction, there may however also be formed intermolecular aldol condensations between the active CH groups which are α-oriented relative to the aldehyde groups in the polyaldehydo-carboxylic acid and, on the other hand, the carbonyl groups of one or several adjacent chains. In this way there result cross-linking connections. It is, in any case, essential for the use of the polymers as builder salts that there be present the units identified as (I) and (II).

In case of the use of further comonomers in addition to acrolein and possibly an acrylic acid, such as maleic acid, and/or vinyl alcohol derivatives and/or allyl alcohol, units of the type (IV), as defined above, may be present in minor amounts in the main chain. The amount may be up to 50 mol. percent. These units can be used to control the water solubility and/or the acidity and thus permit the use even in extreme pH ranges.

Units of the type (V) and (VI) form if the reaction of the polyaldehydro-carboxylic acids is carried out with a strong base by the Cannizzaro method in the presence of formaldehyde. The amount of aldehyde in this case will control the degree of cross-linking.

In spite of the fact that the making of the polyaldehydro-carboxylic acids in the first phase is effected by radical polymerization of acrolein, there may be present in the main chain units of the formula

(VII)

in minor amounts. In general their amount should not be in excess of 25 mol. percent. There may also be minor amounts of unmodified carbonyl groups in the final polymer. Both groups, however, are without significance for the use of the polymers as builder salts. Also without significance are the terminal groups in the polymer which depend on the reaction conditions and the reaction medium. If the starting materials are acrolein and $H_2O_2$, one of the terminal groups will always be a hydroxyl group. In all other cases, the terminal groups are COH-, $CH_2$-OH, COOH- or $CH_2$=CH groups or hydrogen atoms or residues of the employed catalysts.

As indicated, the polymers of the invention must have a degree of polymerization which is at least 3. The upper limit of the polymerization degree is only prescribed by the intended use. For certain purposes, polymerization degrees of about 5,000 may be considered.

General Formulation

The compositions of the invention in general may, for instance, have the following formulation:

1 – 80, preferably 5 – 40, weight percent of a surfactive agent consisting of anionic and/or hybrid ionic and/or non-ionic tensides;

99 – 20, preferably 95 – 60 weight percent of the builder material which in its entirety or partially consists of the above-defined polyoxycarboxylic acid and/or their salts; and 0 – 30, preferably 1 – 25 weight percent of other conventional washing and cleaning agent components.

Instances of general conventional components which can be included in the compositions of the invention are, for example, foam stabilizers, surface active non-tensidic foam inhibitors, bleaches, soil release agents, softeners, anti-microbic agents, enzymes, coloring and scenting agents and water.

In the event that the builder material is only partially composed of the described polyoxycarboxylic acids and/or their salts, there can be present from 10 – 90, preferably 10 – 60 weight percent of inorganic and/or organic water-soluble compounds of the type conventionally employed in wash and cleaning compositions as builder material. Such conventional builder materials will further be described below.

In a wash and cleaning composition, even though the builder material may include 10 – 60 weight percent of condensed phosphates such as sodium tripolyphosphate, the undesirable properties of the condensed phosphates are mostly avoided by the concurrent presence of the builder materials of the invention. However, preferably such inorganic or organic water soluble compounds should not constitute nutrients for microorganisms and in particular should not contain phosphorus.

Preferably the tenside component consists of at least 50 weight percent of anionic surfactants, such as, capillary-active sulfates, sufonates or soaps.

In the detergents, the builder compounds should be present in quantities amounting to, preferably, 0.50 to 7 times and most preferably 1 to 5 times the total of the amount of surfactant.

Preferably the builder material contain alkali in an amount whereby a one percent solution of the final washing or cleaning agent has a pH in the range of 8–12 and preferably 9–11.

If the compositions of the invention contain more than 40 weight percent of the surfactants, they are mostly suited for industrial purposes, for example, for use in laundries and in the textile industry where they are rarely used alone but usually in combination with conventional additives.

More specifically the detergents of the invention which are particularly suitable as washing agents may have the following formulation:

a. 5–80, preferably 8–40 weight percent of a surfactant combination consisting of:
   10–100, preferably 25–65, weight percent surfactants of the sulfonate or sulfate type preferably containing 8–18 carbon atoms in the hydrophobic portion; 0–90, preferably 5–40, weight percent non-ionic surfactants;
   0–90, preferably 10–50, weight percent soaps, inclusive, a soap serving as foam inhibitor and derived from saturated fatty acids having 20–62 carbon atoms;
   0–6, preferably 0.5–3, weight percent foam stabilizers;
   0–8, preferably 0.5–5, weight percent non-surfactant foam inhibitors;
b. 20–95, preferably 60–92, weight percent of builder compounds which entirely or to a portion as indicated comprise the defined polyoxycarboxylic acids and/or their salts, and
c. 0–30, preferably 1–15, weight percent of other wash agent components, such as, for instance, bleaching agents, soil release agents, softeners, antimicrobics, enzymes, brighteners, dyeing and scenting agents and water.

If the wash compositions should have bleaching properties they may also contain a bleaching component which inclusive of stabilizers and/or inactivators may amount to 2–35, preferably 7–30 weight percent of the total wash composition in which case the amount of the builder compounds is then lower. However, it may not comprise less than 20 weight percent of the total composition or all other components must be correspondingly reduced.

If the products are intended for use in drum washing machines, they may be either a combination of surfactants of the sulfonate or sulfate type and soap in a ratio between 30 : 1 and 1 : 5, preferably between 20 : 1 and 1 : 2, or in form of a non-surface active foam inhibitor. In these foam inhibited compositions, the total soap includes portions derived from saturated fatty acids of 20–26, preferably 20–22, carbon atoms in an amount of at least 5 weight percent, preferably at least 10 weight percent, of the total soap content.

Method of Making

The process of making the detergent compositions of the invention may vary. Thus, for instance, the components in form of more or less fine powders or granulates may be mixed to form the desired pulverulent composition.

In accordance with the usual industrial manufacturing method, a watery slurry of the components or of a part thereof is prepared which is then converted into a dry product. Additional hydrates forming inorganic salts may be incorporated into the slurry as part of the builder materials in such amount that the total water present may then be bound as water of crystallization. The mass can then solidify without any further action, although the solidification process can be accelerated by cooling. The solid product can thereafter be comminuted in conventional manner. If the mass is then subjected to cold atomization, a pulverulent product is directly obtained.

As hydrates forming inorganic salts, there can be used water soluble salts, sodium tripolyphosphate, sodium pyrophosphate, sodium sulfate, sodium carbonate and the like, all of which are conventional builder components and are further described hereinafter. These materials can be used together with the above-defined polyoxycarboxylic acids in the washing and cleaning compositions of the invention.

According to the present practice customarily the initial aqueous mass is subjected to hot drying as for instance on hot surfaces or in a heated air current. If the washing compositions of the invention are prepared by subjecting the aqueous initial mixture of the components to hot drying, some of the washing agent components as, for instance, foam inhibitors, bleaching agents, enzymes and the like are not incorporated into the aqueous mass but are thereafter added to the pulverulent wash composition. It is then of advantage in order to gently incorporate small amounts of additives which serve to make the product more effective or attractive, as for instance enzymes, antimicrobics, washing and scenting agents, to first form these additives into a dry powdery preproduct and then to mix the preproduct in the conventional manner with the pulverulent washing or cleaning composition.

The compositions of the invention can be in form of a powder, agglomerate or granulate of a particle size of 0.1–3 mm, with preferably and desirably at least 90 percent of the particles having a particle size of 0.3–2 mm. The term "pulverulent" is used herein in its customary meaning in connection with washing and cleaning agents, i.e., the particle sizes may vary from fine pulverulent to large grain sizes including granulates or agglomerates.

Surface Active Agents

The anionic, hybrid ionic or non-ionic surfactants have in their molecule at least one hydrophobic group of usually 8–26, preferably 10–22 and most preferably 10–18 carbon atoms and at the least one anionic, non-ionic or hybrid ionic water solubilizing group. The preferably saturated hydrophobic group is generally aliphatic, possibly also alicyclic in nature; it can be attached to the water solubilizing group directly or through connecting linkages. As connecting linkages there may be used benzene rings, carboxylic acid ester or carbonamide groups, ethers or esters formed with polyvalent alcohols, as for instance the ethylene glycols, the propylene glycols, glycerines or corresponding polyether groups.

The hydrophobic group is preferably an aliphatic hydrocarbon group of about 10–16, preferably 12–18 carbon atoms. However, according to the nature of the actual surfactant, deviations from this range are possible.

As anionic wash active substances there may be used soaps of natural or synthetic fatty acids, possibly also of resins or naphthenic acid, particularly if these compounds have iodine numbers of up to 30 and preferably as low as 10.

Of the synthetic anionic surfactants, the sulfates and sulfonates are of particular practical significance.

To the sulfonates belong for example, the alkyl arylsulfonates, especially the alkyl benzene sulfonates, which for example are obtained from straight chain aliphatic hydrocarbons of 9–15, preferably 10–14 carbon atoms by chlorinating and alkylating benzene or from the corresponding terminal or inner olefins by alkylation of benzene and sulfonation of the recovered alkyl benzene. Further aliphatic sulfonates are suitable as are obtained for instance from saturated hydrocarbons of 8–18, preferably 12–18, carbon atoms through sulfochlorination with sulphurdioxide and chlorine or sulfooxidation with sulfurdioxide and oxygen followed by the conversion of the obtained product to the sulfonate. Among aliphatic sulfonates, there are also suitable alkane sulfonates, hydroxy alkane sulfonates and disulfonate containing mixtures which for instance are obtained from terminal or inner $C_{8-18}$, and preferably $C_{12-18}$, olefines through sulfonation with sulfurtrioxide and acidic or alkaline hydrolysis of the sulfonation product. In the thus prepared aliphatic sulfonates, the sulfonate group is generally located on a secondary carbon atom, but there can also be used sulfonates having end position sulfonate groups which are obtained by conversion of terminal position olefins with bisulfite.

Included among the useful sulfonates are salts, preferably dialkali salts of $\alpha$-sulfo fatty acids, as well as salts of esters of these acids with mono- or polyvalent, 1–4, preferably 1–2 carbon atoms containing alcohols.

Further useful sulfonates are the salts of fatty acid esters of oxyethane sulfonic acid or of dioxy propane sulfonic acid, the salts of fatty alcohol esters of lower 1–8 carbon atoms containing aliphatic or aromatic sulfomono- or dicarboxylic acids, the alkylglyceryl ethersulfonates as well as the salts of the amide type condensation products of fatty acids or sulfonic acids with aminoethanesulfonic acid.

As tenside of the sulfate type there may be mentioned the fatty alcohol sulfates, in particular those prepared from coconut fatty alcohols, tallow fatty alcohols or oleyl alcohols. Also usable sulfonation products of the sulfate type are obtained from end- or inner position $C_{8-18}$ olefins. There also belong to this group of tensides, sulfated fatty acid alkylolamides or fatty acid monoglycerides as well as sulfated alkoxylated products of alkyl phenols ($C_{8-15}$ alkyl), fatty alcohols, fatty acid amides or fatty acid alkylolamides which in their molecules can contain 0.5 – 20, preferably 1 – 8 and most preferably 2 –4 ethylene and/or propylene glycol groups.

As anionic tensides of the carboxylic type, there are suitable for instance the fatty acid esters or fatty alcohol ethers of hydroxy carboxylic acids and as well the amide type condensation products of fatty acids or sulfonic acids with aminocarboxylic acids, for instance, with glycocol sarcosin or with albumen hydrolysates.

To the non-ionic tensides, hereinafter for the sake of simplicity designated "non-ionics," belong products whose water solubility is caused by the presence of polyether chains, amonooxide, sulfoxide- or phosphinoxide groups, alkylolamide groups or a multiplicity of hydroxyl groups.

Of particular practical interest are the addition products obtained by addition of ethyleneoxide and/or glycol to fatty alcohols, alkylphenols, fatty acids, fatty amines, fatty acids or sulfonic acid amide containing products whereby these non-ionics contain 4 – 100, preferably 6 – 40 and most preferably 8 –20 ether groups, particularly, ethylene glycolether groups per molecule. In addition propylene or butylene glycol ether groups or polyether chains can be present in the polyether chains or at their ends.

Further there are suitable as non-ionics, the compounds marketed under the tradename "Pluronics" and "Tetronics." These products are obtained from water insoluble polypropylene glycols or from water insoluble proproxylated lower $C_{1-8}$, preferably $C_{3-6}$, aliphatic alcohols or from water insoluble propoxylated alkylene diamines. These water insoluble (i.e., hydrophobic) propylene oxide derivatives are then converted to the mentioned non-ionics by ethoxylation until they are water soluble. Finally as non-ionics there are also usable the products known as "Ucon-Fluid" which are partly water soluble reaction products of the above named aliphatic alcohols with propylene oxide.

To the non-ionics, there belong also fatty acid or sulphonic acid alkylolamides which for instance are derived from mono- or diethanolamine or dihydroxypropylamine, or from di- or polyhydroxy alkylamines, for instance, glycamines. They can be replaced by amides of higher primary or secondary alkylamines and polyhydroxy carboxylic acids. As capillary-active aminooxides there may be mentioned for instance the products derived from higher tertiary amines containing a hydrophobic alkyl group and two lower (up to 4 carbon atoms) alkyl and/or alkylol groups.

Hybrid ionic tensides contain in their molecule acidic as well as basic hydrophilic groups. Among the acid groups are carboxyl sulfonic acid-, sulfuric acid semi-ester-, phosphonic acid and phosphoric acid partial ester groups. Basic groups are, e.g., primary, secondary, tertiary and quaternary ammonium groups. Hybrid ionic compounds with quaternary ammonium groups belong to the betaine group.

Carboxy-, sulfate-, and sulfonate betaines because of their compatability with other tensides are of particular practical significance. Suitable sulfobetaines are obtained for instance through reaction of a tertiary, at least one hydrophobic alkyl group containing amine with sultones, for example, propane- or butane sultone. Corresponding carboxybetaines are obtained by reaction of the tertiary amines with chloracetic acid, its salts or chloroacetic esters followed by splitting of the ester bond.

Foam Stabilizers

The foaming ability of the tensides can be increased or decreased through the combining of suitable tenside types, and can also be altered through addition of non-tenside type organic substances.

Suitable as foam stabilizers are, above all, tensides of the sulfonate- or sulfate type, capillary- active carboxy- or sulfobetaines as well as the above-mentioned non-ionics of the alkylolamide type. In addition there can be used for this purpose fatty alcohols or higher terminal diols.

Products having reduced foaming ability are above all indicated for use in washing and rinsing machines where sometimes a limited foam inhibition is satisfactory while in other cases a stronger foaming inhibition is necessary. Of particular practical significance are products which in the average temperature range of up to about 65°C still foam, but which at higher temperatures, i.e. 70° – 100°C produce less and less foam.

Reduced foaming is obtained by combination of different types of tensides, in particular, by combination of synthetic anionic tensides, and particularly of (1) sulfates and/or sulfonates or of (2) non-ionics on the one hand and of (3) soaps on the other hand. By combination of components (1) and (2) or of (1), (2) and (3), it is possible to control the foam content by the type of soap. When soaps are used which are obtained from saturated fatty acids of 12 – 18 carbon atoms, the foaming inhibition is lower than with soaps of saturated fatty acid mixtures of 20 – 26, preferably 20 – 22 carbon atoms, in amounts of at least 5 and preferably at least 10 weight percent of the total soap component present in the tenside combination. A strong foam inhibition particularly in the higher temperature range is possible.

The foaming ability of tensides can also be adjusted through the addition of known non-tensidic foam inhibitors. To this group of materials belong the possibly chlorine-containing N-alkylated aminotriazines, which are obtained by reaction of 1 mol cyanuric chloride with 2 – 3 mols of a mono- and/or di-alkylamine containing 6 – 20, preferably 8 – 18 carbon atoms in the alkyl group. Similarly there may be used aminotriazines or melamine derivatives which contain propylene glycol or butylene glycol ether chains and which can contain in their molecules 10 – 100 groups of this type. This type of compound is prepared, for instance through addition of corresponding numbers of propylene and/or butylene oxide to aminotriazines, in particular to melamine. Preferred are for instance the reaction products of one mol melamine with at least 20 mols propylene oxide or with at least 10 mols butylene oxide.

Particularly effective products are compounds obtained by addition of 5 – 10 mols propylene oxide to 1 mol melamine and the further addition of 10 – 50 mols butylene oxide to the thus obtained propylene oxide derivative.

Instances of other non-tensidic water-insoluble organic compounds include paraffin or halogenated paraffin having a melting point under 100°C, aliphatic $C_{18}$-$C_{40}$- ketone, as well as aliphatic carboxylic acid esters which in the acid or alcohol group, or possibly in each of these groups, contain at the least 18 carbon atoms (for instance triglyceride or fatty acid-fatty alcohol esters). These compounds can be used in combinations of anionic synthetic tensides and soaps as foam inhibitors.

The non-tensidic foam inhibitors are often only fully active at temperatures at which they are present in the liquid state, so that the foam content of the product through choice of suitable foam inhibitors is regulated in like manner as through the choice of soaps of fatty acids of suitable chain length.

If foam stabilizers are combined with temperature-dependent foam inhibitors, there are obtained products which at low temperatures have good foaming characteristics, but which when approaching the boiling temperature evolve less and less foam.

As preferred low foaming non-ionic tensides, which can be used singly or in combination with anionic or hybrid ionic tensides in order to reduce the foaming of the higher foaming tensides, addition products of propylene oxide to the above-described capillary-active polyethyleneglycol ethers as well as the above-described pluronic, tetronic, and Ucon-fluid types can be used.

Other Builder Compounds

Builder materials which possibly may be used with the above-defined polyoxycarboxylic acid or their salts are certain weakly acidic, neutral or alkaline-reacting organic and inorganic salts, especially inorganic or organic complexing agents.

Suitable inorganic and organic builder materials are for instance the bicarbonates, carbonates, borates, or silicates of alkalis, further mono-, di-, or tri-alkali orthophosphahtes, di- or tetraalkalpyrophosphates, metaphosphates known as complex-formers, alkali sulfates as well as the alkali salts of organic, non-capillary-active, 1 – 8 carbon-atom-containing sulfonic acid, carboxylic acid and sulfocarboxylic acids. In this group are, for instance, water-soluble salts of benzene-, toluene- or xylene sulfonic acid, water-soluble salts of sulfo-acetic acid, sulfobenzoic acid or salts of sulfodicarboxylic acids, as well as the salts of acetic acid, lactic acid, citric acid and tartaric acid.

Suitable as complex forming builder materials are also the weak acid reacting metaphosphates, as well as the alkaline-reacting polyphosphates, in particular the tripolyphosphate. Further are useful as organic complex formers, compounds of the type of amino polycarboxylic acids, such as, nitrilo triacetic acid, ethylenediaminetetraacetic acid, N-hydroxyethyl-ethylenediaminetriacetic acid, polyalkylene-polyamino-N-polycarboxylic acids and other known organic complex formers, including combinations of different complex formers. Among other known complex formers are also di- and polyphosphonic acids of the following structural formula

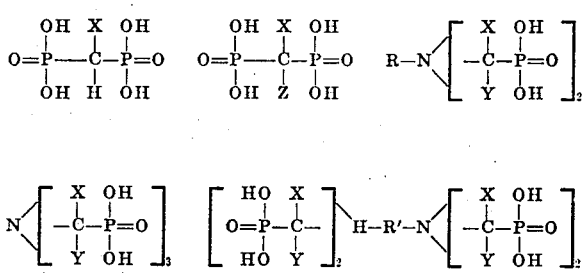

wherein R is alkyl and R' is alkylene of 1 - 8, preferably 1 - 4 carbon atoms, X and Y are hydrogen or alkyl of 1 - 4 carbon atoms, and Z is -OH, -NH$_2$ or -NXR. For practical use,e the following are particularly preferred: methylenediphosphonic acid, 1-hydroxyethene-1,1-diphosphonic acid, 1-aminoethane-1,1-diphosphonic acid, amino-tri-(methylenephosphonic acid), methylamino- or ethylamino-d-(methylenephosphonic acid), as well as ethylenediamine-tetra-(methylenephosphonic acid). All of these complex formers can be used as free acids and preferably as alkali salts.

Soil Release Agents

In the compositions of the invention there can further be present soil release agents which keep soil which is detached from the fibers suspended in the bath and thereby inhibit graying. For this, water soluble colloids, mostly organic in nature, are suited, as for instance the water soluble salts of polymeric carboxylic acids, sizings, gelatine, salts of ether carboxylic acids or other sulfonic acids of starch or cellulose or salts of acidic sulfuric acid esters of cellulose or starch. Further water soluble acid groups containing polyamides are suitable for this purpose. In addition soluble starch compounds and other than the above-named products can be used, as for instance degraded starch, aldehyde starch and the like. Also the polyvinylpyrrolidones are useful for this purpose.

The components of the wash and cleaning compositions of the invention, in particular the builder materials, are selected to cause the composition to have a neutral to clearly alkaline reaction and to cause the pH value of a 1% solution of the composition generally to be within the pH range of 7-12. Thus, washing compositions for fine fabrics are generally neutral to weakly alkaline in reaction (pH value 7 - 9.5), while soaking, preliminary wash and boiling point wash agents are more strongly alkaline (pH value 9.5-12, preferably 10 - 11.5).

Bleaching Agents

Among the preferably inorganic per compounds used as bleaching agents, sodium perborate tetrahydrate (NaBO$_2$.H$_2$O$_2$.3H$_2$O) is of particular importance. In place of this compound, there can be used in part or entirely dehydrated perborates, such as NaBO$_2$.H$_2$O$_2$. There are also described in German patent 901,287 or in U.S. Pat. No. 2,491,789 borates of the type NaBO$_2$.-H$_2$O$_2$ in which the ratio of Na$_2$O : B$_2$O$_3$ is smaller than 0.5 : 1 and preferably is in the range of 0.4 - 0.15 : 1 while the ratio of H$_2$O$_2$ : Na is in the range of 0.5- 4 : 1. All these perborates can be replaced entirely or partially by other inorganic per compounds and especially by peroxyhydrates, for instance, the peroxyhydrates of ortho-, pyro- or polyphosphates, in particular, the tripolyphosphate as well as the carbonates.

It is advisable to add to the products for stabilizing the per compounds conventional water soluble and/or water insoluble stabilizers in amounts of 0.25 - 10 weight percent. Water insoluble per-stabilizer, in an amount for instance of 1 - 8, preferably 2 - 7 percent, by weight of the total composition are, e.g., magnesium silicates of the type MgO : SiO$_2$ = 4 : 1 to 1 : 4, preferably 2 : 1 to 1 : 2, and most preferably 1 : 1 and obtained generally through precipitation from aqueous solutions. In place of the magnesium silcates, there can be used other earth alkali-, metal-, cadmium- or tin-silicates in corresponding amounts. Also water containing oxides of tin are suitable as stabilizers which can be used together with water insoluble stabilizers are the organic complex builders which can be used in amounts of 0.25 - 5, preferably 0.5 - 2.5 percent of the weight of the entire preparation. The active chlorine compounds used as bleaching agents can be inorganic or organic in nature.

Among the inorganic active chlorine compounds are alkali hypochlorites, particularly in the form of their mixed salts or addition compounds to orthophosphates or condensed phosphates as, for insance, to pyro- and polyphosphates or to an alkali silicate. If the washing and cleaning compositions contain monopersulfates and chlorides there is formed active chlorine in the aqueous solution.

Among the organic active chlorine compound, are in particular the N- chlorine compounds in which 1 or 2 chlorine atoms are bound to a nitrogen atom and wherein the third valence of the nitrogen atom connects with a negative group, particularly, a CO- or SO$_2$ group. Included among these compounds are the di-chloro- and trichlorocyanuric acids or their salts, chlorinated alkyl guainidines or alkylguanidines chlorinated hydantoins and chlorinated melamines.

Brighteners

Derivatives of diaminostilbensulfonic acid or diarylpyrazolines and of the amino cumarines can usually though not in all cases be used as brighteners.

Examples of brighteners of the class of diaminostilbenesulfonic acid derivatives are the compounds of the formula:

(A$_1$)

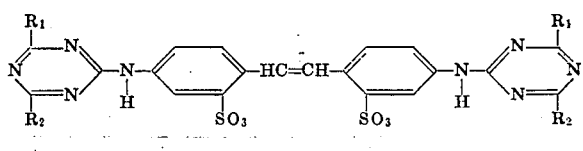

In the formulae R$_1$ and R$_2$ are halogen, alkoxy, amino, aliphatic, aromatic or heterocyclic primary or secondary amines as well as groups of aminosulfonic acids, the aliphatic moieties present in the above groups preferably having 1 - 4 and most preferably 2 - 4 carbon atoms while in the heterocyclic ring system generally 5 or 6 member rings are present. As aromatic amine there are preferred the residues of aniline, anthranilic acid or aniline sulfonic acid.

The brighteners derived from diaminostilbenesulfonic acid are usually employed as cotton brighteners. There are commercially available compounds derived from above formula $A_1$ wherein $R_1$ is the group -NH-$C_6H_5$ and $R_2$ is -$NH_2$, -NH-$CH_3$, -NH-$CH_2$-$CH_2OH$, -NH-$CH_2$-$CH_2$-O-$CH_3$, -NH-$CH_2$-$CH_2$-$CH_2$-O-$CH_3$, $CH_3$-N-$CH_3$-$CH_3$-OH, -N=($CH_2$-$CH_2OH)_2$, morpholino-, -NH-$C_6H_5$, -NH-$C_6H_4$-$SO_3H$ or -$OCH_3$.

Some of these brighteners are with regard to fiber affinity, a transition type to the polyamide brighteners, for instance, the brightener wherein $R_2$ is NH-$C_6H_5$. Among the cotton brighteners of the diaminostilbenesulfonic acid type is the compound 4,4'-bis-(4-phenyl-vicinal-triazolyl-2)-stilbene disulfonic acid-2,2'.

Among the polyamide brighteners of which some again have an affinity for cotton fibers are the diaryl pyrazolines having the formulae $A_2$ and $A_3$.

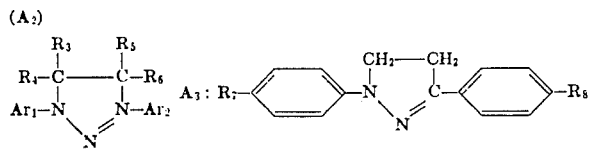

In the formula $A_2$, $R_3$ and $R_5$ are hydrogen, or alkyl or aryl which may be substituted by carboxy, carbonomide- or ester groups, $R_4$ and $R_6$ are hydrogen or lower alkyl, $Ar_1$ or $A_2$ aryl, such as phenyl, diphenyl or naphthyl, which can be further substituted for instance with hydroxy, alkoxy, hydroxyalkyl, amino, alkaylamino, acylamino, carboxyl, carbonic acid ester, sulfonic acid, sulfonic amide and sulfone groups or by halogen. Commercially available brighteners are derived from the formula $A_3$, $R_7$ being Cl, $SO_2$-$NH_2$, -$SO_2$-CH=$CH_2$ and -COO-$CH_2$-$CH_2$-O-$CH_3$, while the substituent $R_8$ is always chlorine. Also the 9-cyanoanthrancene is commercially available as polyamide brightener.

Included among the polyamide brighteners are the aliphatic or aromatic substituted amino cumarines, for instance 4-methyl-7-dimethylamino or 4-methyl-7-diethylamino cumarine. Further examples of polyamide brighteners are the compounds 1-(benzimidazolyl-2')-2-(N-hydroxyethyl-benzemidazolyl-2')-ethylene and 1-N-ethyl-3-phenyl-7-diethylamino-carbostyril. As brighteners for polyester and polyamide fibers, the compounds 2,5-di-(benzoxazolyl-2')-thiophene and 1,2-di-(5'-methylbenzoxazolyl-2')-ethylene have proved suitable.

If the brighteners with the other components of the composition are in the form of aqueous solutions or pastes and are through hot drying coverted to the solid state, it is preferred, for stabilizing the brighteners, to use organic complex formers in amounts of at least 0.1, preferably 0.2 – 1 weight percent of a solid product.

Enzymes

The enzymes are generally used in the form of mixtures of different enzymatically active agents. Depending on their action they are designated as proteases, carbohydrases, esterases, lipases, oxidoreductases, catalases, peroxidases, ureases, isomerases, lyases, transferases, desmolases or nucleases. Of particular interest are the enzymes derived fromm bacteria or fungi such as bacillus subtilis and streptomyces griseus, in particular, proteases or amylases. The compositions derived from bacillus subtilis have the advantage that they are resistant to alakali, percompounds and anionic wash active substances and still active at temperatures up to 70°C.

The enzyme preparations are manufactured usually as aqueous solutions or with addition of blending agents as powders. Examples of suitable blending agents are sodium sulfate, sodium chloride, alkali ortho-pryo- or polyphosphates, in particular tripolyphosphate. The moist enzymes are often combined with calcined salts which may form agglomerates while binding the enzyme material and the water of crystallization.

If the enzymatic substances are in the form of dry powders, then liquid, pasty, or even solid non-ionic, preferably capillary-active organic compounds and particularly the above described non-ionics may be formed to bind the enzymes to the particles of the washing and cleaning composition. For this purpose preferably a mixture of the particular composition and the enzymatic substances is sprayed with the non-ionic substances and the dispersion is combined with the remaining components. If the remaining components are solids the dispersion of the enzyme in the non-ionic component can also be sprayed onto the remaining solids.

The enzyme or combinations of enzymes having different activities are introduced in an amount whereby the finished product has a protease activity of 50 – 5,000 and preferably 100 – 2,500, LVE/g and/or an amylase activity of 20 – 5,000, preferably 50 – 2,000, SKBE/g and/or lipase activity of 2 – 1,000, preferably 5 – 500, IE/g.

These data regarding the enzyme activities are determined from the activity of the enzyme compound as it appears acceptable at the time of filing this application in the country of origin. From the industrial point the enzyme activity of the preparation can be increased as required so that the activity of the protease and amylayse amounts for instance to more than 5 times that of the lipase up to 10 times of the above maximum values. Therefore, should in the future, compositions with higher activities become available which appear useful for detergent use, this may permit to increase the enzyme activity.

Regarding enzymatic activity determination, reference is made to the following literature.

A. Determination of the activity of proteases according to Lohlein-Volhard:

A. Kunzel : "Gerbereichemisches Taschenbuch," 6th Edition, Dresden and Leipsig 1955;

Determination of the Activity of Amylase J. Wohlgemuth : "Biochemische Zeitschrift," Vol. 9, (1908), pages 1 – 9;

R. M. Sandstedt, E. Kneen and M. J. Blish: "Cereal Chemistry," Vol. 16 (1939), pages 712–723;

B. Determination of the Activity of lipases: R. Willstatter, E. Waldschmidt - Leitz and R. Memmen : "Hoppe-Scyler's Zeitschrift fur physiologische Chemie," Vol. 125 (1923), pages 110–117;

R. Boissonas : "Helvetica Chemica Acta," Vol. 31 (1948), pages 1571 – 1576.

EXAMPLES

General Terminology and Data Use

The following examples describe compositions prepared in accordance with the invention. The salt type components as used therein, for instance, the salts of the surfactive agents or the organic salts as well as the inorganic salts were used as sodium salts, unless otherwise indicated. The abbreviations used in the examples have the following meaning:

"ABS," the salt obtained by condensing straight-chain olefin with benzene and sulfonating the thus obtained alkyl benzene to form alkylbenzene sulfonates having 10 – 15 and preferably 11 – 13 carbon atoms in their alkyl chains.

"Alkane sulfonate," the sulfonate obtained from paraffins having 12 – 16 carbon atoms by sulfoxidation.

"Fs-estersulfonate," the sulfonate obtained by sulfonating with $SO_3$, the methyl ester of a hardened tallow fatty acid.

"Olefinsulfonate," the sulfonate obtained by sulfonating an olefin mixture having 13 – 8 carbon atoms with $SO_3$ and then hydrolizing the sulfonation product with lye, which essentially consists of alkene sulfonates and oxyalkane sulfonates. Each olefin-containing sulfonate preparation was produced under use of two different types of olefin sulfonate; where one is derived from a mixture of straight-chain N-positioned unsaturated olefins and the other from a mixture of olefins containing inner position unsaturated bonds.

"KA-sulfates" or "TA-sulfates," the sulfated salts obtained by reduction of coconut fatty acids or tallow fatty acids prepared from essential unsaturated fatty alcohol.

"KA-AO-sulfates" or "TA-AO-sulfates" or "OA-AO-sulfates" the sulfated addition products of 2 mols ethylene oxide to 1 mol coconut fatty alcohol or 3 mols ethylene oxide to one mol tallow fatty alcohol or 2 mol ethylene oxide to 1 mol oleylalcohol.

"Soap A or B," a soap obtained from the fatty acid mixture of 9 wt.-% $C_{18}$, 14 wt.-% $C_{20}$ and 77 wt.-% $C_{22}$ (iodine number 3) (A); or 8 wt.-% $C_{16}$ 12 32 wt.-% $C_{18}$, 12 wt.-% $C_{20}$, and 48 wt.-% $C_{22}$ (iodine number 4) (B);

"OA + 5AO," "OA + 10AO" and "KA + 9 AO + 12PO," the addition product of ethylene oxide (AO) or propylene oxide (PO) to technical oleyl alcohol (OA) or coconut alcohol (KA).

"Perborate," an about 10 percent active oxygen product having the composition $NaBO_2 \cdot H_2O_2 \cdot 3H_2O$.

"NTA", "EDTA" or "HEDP", the salts of nitrilotriacetic acid, of ethylenediaminetetraacetic acid or hydroxyethanediphosphonic acid;

"CMC" the salt of carboxymethylcellulose.

As non-surfactive foam inhibitor there was used in the examples a mixture of about 45 percent of a N,N'-di(alkyl-amino)-chlorotriazine and about 55 percent of a N,N',N''-tri(alkylamino)-triazine. In these triazine derivatives the alkyl group is derived from a mixture of homologs having 8 – 18 carbon atoms.

With equal success, the monochlorotriazine derivative or the trialkylaminotriazine can be used separately. So far as the described products contain synthetic sulfates or sulfonates together with soap, the various other mentioned non-surfactive foam inhibitors could also be used, for instance, paraffin oil or paraffin. For making the composition, the foam inhibitor is dissolved in a suitable solvent or is sprayed in molten state through a spray nozzle onto the powder while agitating the same.

In all of the examples, the amounts are based on pure substance. The substances may however contain residual materials from the process of their manufacture, for instance water, sodium sulfate, sodium carbonate, etc. In the following table the symbol "+" in the line "$Na_2SO_4$" indicates that minor amounts of sodium sulfate are still present in the anionic surfactant. The residual substances do not in any way affect the activity of the composition as they are not present in the principal formulation. The expression "residual" designates essentially water and the afore-named salts, coloring agents and scenting material.

The compounds used in the Examples as building materials have been prepared according to the following method or by analogous procedures. The percentage of carboxylic and hydroxyl groups specified refers to the number of COOH- or -OH groups per 100 monomer units, i.e., $C_2$ units in the chain of the molecule.

The "Hampshire Test" mentioned in some of the Examples is described in a publication of the Hampshire Chemical Corporation, of June 1960 "Hampshire NTA Technical Bulletin", Appendix S. A2.

In this test, exactly 2 g of a pulverulent agent are dissolved in 50 ml distilled water. The solution is neutralized and 10 ml of a 2 percent sodium carbonate solution are added. Then, the solution is adjusted to a pH between 11 and 12, and diluted to a volume of 100 ml. This is followed by titration with a calcium acetate solution which contains 44.1 g of calcium acetate monohydrate per liter until a distinct and permanent turbidity appears. The calcium carbonate bonding action of the complexing agent is calculated according to the following formula:

$$ml \text{ calcium acetate solution} \times 25/\text{initial input of complexing agent} = mg \text{ of chemically bound } CaCO_3 \text{ per gram of complexing agent.}$$

The Examples further will show the activity of the polymers as builder salts and specifically the increase of the wash activity, the ash content, the chemical effect on the fiber and the stabilizing action on the activated oxygen.

General Tests for Various Polyoxycarboxylic Acid Builder Compounds

A. Acrolein homopolymer with use of formaldehyde.

a. 520 ml distilled water and 260 ml 30 percent hydrogen peroxide were heated at 60°C. At 50°C there were within 2.5 hours added thereto 400 ml freshly distilled acrolein in dropwise fashion. During this time already white flocculent polymer began to settle out. After the end of the acrolein addition, the mixture was subjected for about two hours to further mild refluxing under stirring at a temperature of 60°C, at the end of which the refluxing finally stopped. The mixture was then diluted with 500 ml distilled water. The resulting mixture was allowed to cool and, after an hour of standing, was filtered, the precipitate washed with distilled water until odorfree and dried in vacuum at 50°C over sodium hydroxide. There were recovered 186 g polyaldehyde carboxylic acid having an average molecular weight $m = 7,500$; average degree of polymerization = about 120; carboxyl content = 44 percent; carbonyl content = 27 percent.

b. 100 g of the polyaldehyde carboxylic acid prepared according to (a) above were suspended in 400 ml distilled water and 100 ml of a 30 percent formaldehyde solution added thereto. There were then run into this mixture under stirring within 40 minutes 120 ml of a 40 percent sodium hydroxide solution. Ten minutes after the beginning of the sodium hydroxide addition, the reaction mixture became highly viscous and was diluted with 400 ml distilled water. After the addition of 60 ml of the aforesaid sodium hydroxide, the viscosity markedly decreased. There was recovered a clear, thin liquid, bright yellow in color. After an hour of standing the solution was introduced into 280 ml 20 percent hydrochloric acid and brought to precipitation. The mixture was allowed to stand for 15 minutes, the precipitate decanted off and washed with distilled water. After drying, grinding, washing and a final drying, there were recovered 66 g polyoxycarboxylic acid A having a carboxyl content of 59 percent and a hydroxyl content of 31 percent.

c. 3 g of the polycarboxylic acid A prepared according to (b) above were suspended in distilled water and under stirring 15 ml 1N sodium hydroxide added thereto. After 15 minutes, the pH was determined and amounted to 7.0. The undissolved portions were separated off by filtering and the solids dried by evaporation. There were recovered 3.5 g polycarboxylic acid A-sodium-salt. The product bound 300 mg $CaCO_3$/g polyoxycarboxylic acid A-Na-salt, (Hampshire Test).

The mentioned analytical procedure for determining potassium carbonate binding powder (Hampshire Test) as proposed by the Hampshire Chemical Corporation showed the following results with various polyoxycarboxylic acid or their salts when used as builder materials in accordance with the invention. The method of making the acids was analogous to the method described for acid A. The Hampshire Test was determined with the sodium salt of the polymer. The symbol $\bar{P}$ designates the average polymerization degree of the polymer, i.e., the average number of $C_2$-units (formula units I–VII) which are present in the chain of the polymer molecule:

B. Product of acrolein and formaldehyde, $\bar{P} = 3$, Hampshire Test Value : 400, COOH ratio = 4.0

C. Product of acrolein, $\bar{P} = 50$, Hampshire Test Value: 470, COOH : OH ratio = 8.6

D. Product of acrolein and acrylic acid, $\bar{P} = 10$, Hampshire Test Value: 325, COOH : OH ratio = 3.6

E. Product of acrolein, acrylic acid and formaldehyde, $\bar{P} = 320$, Hampshire Test value: 450, COOH : OH ratio = 4.6

F. Product of acrolein, acrylic acid and formaldehyde, $\bar{P} = 600$, Hampshire Test Value: 306, COOH : OH ratio = 5.4

G. Product of acrolein and formaldehyde, $\bar{P} = 5$, Hampshire Test value : 320, COOH : OH ratio = 1.5

H. Product of acrolein and acrylic acid, $\bar{P} = 60$, Hampshire Test Value: 377, COOH : OH ratio = 2.3

I. Product of acrolein, acrylic acid and maleic acid, $\bar{P} = 65$, Hampshire Test Value: 360, COOH : OH ratio = 4.9

J. Product of acrolein, maleic acid and formaldehyde $\bar{P} = 90$, Hampshire Test Value: 224, COOH: OH ratio = 1.0

K. Product of acrolein, acrylic acid and formaldehyde, $\bar{P} = 120$, Hampshire Test Value: 500, COOH : OH ratio = 2.3

L. Product of acrolein, $\bar{P} = 18$, Hampshire Test value: 326, COOH : OH ratio = 8.3

Washing and Cleaning Compositions

Example 1

21.8 wt.-% ABS
32.6 wt.-% Perborate
2.2 wt.-% CMC
43.4 wt.-% builder material: polyoxycarboxylic acid-sodium-salt and/or sodium tripolyphosphate.

The washing and cleaning agent according to the above formulation was prepared by mixing of the powder formed components. As polyoxycarboxylic acid the above identified substance B (1a), 1b)) or C (1 e), 1d)) was used.

The washing strength or activity was determined by the test on cotton with an EMPA standard dirtying (Eidgenoessiche Materialpruefungs- und Versuchsanstalt, St. Gallen (Switzerland); Article No. 101) at 90°C were washed for 15 minutes in a laundrometer with 5 g/l of the preparation according to Example 1. The bath-liquor ratio was 1 : 20 and the water hardness was 10° d.H.

Through reflectance measurements before and after the washing (Zeiss-Elrepho, Blue filter R 46 versus MgO = 100%) of brightness ΔR as an average value was determined. Each reported value represents 25 single test procedures. Example 1 a): 43.4 wt.-% polyoxycarboxylic acid-Na-salt ΔR = +19.1; substance B Example 1 b): 21.7 wt.-% polyoxycarboxylic acid-Na-salt Substance B and 21.7 wt.-% sodium tripolyphosphate ΔR = +23.4;

Example 1 c): 43.4 wt.-% polyoxycarboxylic acid-Na-salt Substance C; ΔR = +23.1

Example 1 d): 21.7 wt.-% polyoxycarboxylic acid-Na-salt substance C and 21.7 wt.-% sodium tripolyphosphate ΔR = +19.0;

Comparison: 43.4 wt.-% sodium tripolyphosphate; ΔR = +18.5

Examples 2–8

| Components of | wt.-% of component in total composition | | | | | | |
|---|---|---|---|---|---|---|---|
| | 2 | 3 | 4 | 5 | 6 | 7 | 8 |
| ABS | 9.0 | | | | 7.5 | 18.0 | 6.5 |
| Alkanesulfonate | | | 22.5 | | | 8.0 | |
| Fs-estersulfonate | | | | | | | 8.5 |
| Olefinsulfonate | | 7.0 | | | | | |
| KA-sulfate | | 1.5 | | | | | |
| TA-sulfate | | | | | | 4.2 | |
| KA-AO-sulfate | | 2.5 | | | | | |
| TA-AO-sulfate | | | | | | | 4.5 |
| OA-AO-sulfate | | | | 5.5 | | | |

Examples 2–8–Continued

| Components of | wt.-% of component in total composition ||||||| 
| --- | --- | --- | --- | --- | --- | --- | --- |
|  | 2 | 3 | 4 | 5 | 6 | 7 | 8 |
| Soap A |  | 3.0 |  |  |  |  | 4.2 |
| Soap B | 2.5 |  |  |  |  | 5.0 |  |
| OA + 5 AO |  |  |  | 1.5 |  |  | 1.5 |
| OA + 10 AO | 2.0 |  |  | 7.5 |  | 2.5 |  |
| KA + 9 AO + 12 PO |  | 1.5 |  |  |  |  |  |
| Nontensidic foam inhibitor | 0.8 | 0.3 |  |  |  | 0.4 | 0.3 |
| Polyoxycarboxylic acid Na-Salt | 25.0 | 23.0 | 55.0 | 30.5 | 28.5 | 38.5 | 15.5 |
| $Na_2SO_4$ | 17.5 | + | + | 25.5 | + | + | 22.0 |
| $Na_2O \cdot 3.3\ SiO_2$ | 5.0 | 4.0 |  |  |  | 6.5 | 5.5 |
| $Na_5P_3O_{10}$ |  | 23.0 |  | 12.0 |  |  |  |
| $Na_2CO_3$ |  |  |  |  | 21.0 |  |  |
| Perborate | 18.0 | 20.5 |  |  |  | 22.0 | 16.5 |
| $MgSiO_3$ | 1.3 | 1.5 |  |  |  | 1.5 | 1.4 |
| HEDP |  |  |  |  | 5.5 |  |  |
| NTA | 8.5 |  |  |  |  |  | 15.2 |
| EDTA |  |  |  | 5.2 |  |  |  |
| CMC | 1.5 | 2.0 | 3.0 | 2.8 | 1.8 | 1.9 | 2.4 |
| Brightener | 0.6 | 014 | 0.8 |  | 0.4 | 0.3 | 0.4 |
| Remainder |  |  |  |  |  |  |  |

As brighteners in these Examples there were used cotton brighteners, polyamide brighteners, polyester brighteners and combinations thereof.

If enzymes were used, the commercially available products were employed as follows, if possible in the form of solid enzyme concentrates. The activity was adjusted for instance by addition of inorganic salts mainly sodium sulfate or sodium tripolyphosphate, for instance to the following activities:

a protease with 125,000 LVE/g, an amylase with 75,000 SKBE/g, a lipase with 10,000 IE/g.

As powder-form cleaning agent for cleaning non-textile surfaces, as for instance walls, tiles, bathtubs, wash basins, lacquer doors, linoleum, household apparatus including dishes, general instruments, carpets, etc. the following preparation can be used:

Example 9:

27.5 wt.-% ABS
4.0 wt.-% KA-sulfate
5.0 wt.-% sodium tripolyphosphate
5.0 wt.-% polyoxycarboxylic acid (substance A-L)

5.0 wt.-% $Na_2B_4O_7 \cdot 10H_2O$
remainder — sodium sulfate, coloring and scenting agents, and water.

Example 10:

30.0 wt.-% ABS
2.5 wt.-% Ka-AO-sulfate
0.5 wt.-% stearic acid monoethanolamide 2.5 wt.-% $Na_2B_4O_7 \cdot 10H_2O$,
12.0 wt.-% polyoxycarboxylic acid (substance A-L)

remainder — sodium sulfate, perfume and coloring agents and water.

EXAMPLE 11:

Portions of a cotton textile were soiled with the so-called EMPA standard soiling provided by the Eidgenoessiche Marterialpruefungs- und Versuchsanstalt, St. Gallen of Switzerland (Article No. 101). The textiles were then washed in a commercial washing machine at 90°C for periods, in each case, of 15 minutes in a detergent solution at the liquor ratio of 1 : 20. The solution had the following composition, stated in amounts per liter:

1.0 g alkylbenzenesulfonate
0.5 g sodium silicate ($Na_2O/SiO_2 = 1:2$)
1.5 g sodium perborate tetrahydrate
0.1 g carboxymethyl cellulose To prepare the solution water was used having 10 German hardness degrees and the washing was carried out with an "Atlas-Launderometer" washing machine. The tests were set up in six parallel series in which the following additions were made to the base solution (in g/l):

a. no additive
b. 0.5 g sodium salt of a polyhydroxy carboxylic acid of an average degree of polymerization $\bar{P} = 3$, a COOH/CH ratio of 4:1, and a Hampshire Test value of 400
c. 2.0 g of the same additive as at (b)
d. 2.0 g of sodium tripolyphosphate
e. 2.0 g of sodium pyrophosphate
f. 0.5 g of the additive at (b) + 0.5 g of sodium tripolyphosphate Prior and after washing the reflectance was measured at the EMPA salt textile using a Zeiss-Elrepho Blue Filter R 46 against MgO = 100 percent. In the six different series the following brightening degrees, expressed as $\Delta R$ as mean values for each 25 individual tests were established:

| Solution: | a | b | c | d | e | f |
| --- | --- | --- | --- | --- | --- | --- |
| $\Delta R$ | +6.0 | +21.5 | +19.1 | +18.5 | +21.8 | +23.4 |

Example 12:

The same procedure was followed as in Example 11. However, a polymer with a mean polymerization degree of $\bar{P} = 50$, a COOH/OH ratio of 8.6 : 1, and a Hampshire Test value of 470 was used in this washing solution. To the solution there were added in three parallel test series the following additives (in g/l):

g. 0.5 g sodium salts of a polyhydroxy carboxylic acid (P = 50; COOH/OH = 8.6:1)
h. 2.0 g of the additive at (g)
i. 0.5 of the additive at (g) plus 0.5 g of sodium tripolyphosphate.

After washing the following brightening values were established on the EMPA salt textile, expressed as ΔR, each the mean values of twenty-five individual tests:

| Solution: | g | h | i |
|---|---|---|---|
| ΔR | +12.6 | +23.1 | +19.0 |

Example 13:

This test was carried out in order to determine the accumulation of deposits on the tsetile during the washing operation. For this purpose portions of a bleached white cotton textile were washed twenty-five times in succession at 90°C for 15 minutes in a commercial washing machine. In parallel test series washing solutions were used with the additives (a) to (i) as described in Examples 11 and 12.

Specimens of the air-dried textile portions were then incinerated in a porcelain crucible after 25 washing operations and subjected to calcination at 800°C for sixty minutes. After cooling in an desiccator, the calcination residue was weighed and expressed as textile-ash in weight-percent as follows:

| Solution | Textile Ash (wt.-%) |
|---|---|
| [a] | 4.6 |
| [b] | 0.2 |
| [c] | 0.9 |
| [d] | 0.1 |
| [e] | 3.3 |
| [f] | 0.1 |
| [g] | 0.6 |
| [h] | 0.1 |
| [i] | 0.1 |

Example 14:

This test series had the purpose to determine the stabilization of activated oxygen and the corresponding amount of chemical damage to the fibers. For this purpose a bleached white cotton textile (initial DP*[=degree of polymerization] 1720, determined by the Cuoxam Method) was washed 25 times in succession in the washing solutions described in Examples 1 and 2 at (a) to (i). The activated oxygen residue was determined at the end of each washing operation and the final DP value was determined after 25 washing operations. The values obtained appear from the following table:

| Solution | Activated oxygen residue [in % of initial amount; mean values] | Final DP | Factor of injury to cloth * |
|---|---|---|---|
| [a] | 91 % | 1525 | 0.2 |
| [b] | 82 % | 1295 | 0.5 |
| [c] | 88 % | 1500 | 0.2 |
| [d] | 63 % | 905 | 1.0 |
| [e] | 81 % | 1305 | 0.5 |
| [f] | 75 % | 980 | 0.9 |
| [g] | 92 % | 1585 | 0.1 |
| [h] | 79 % | 1070 | 0.8 |
| [i] | 84 % | 1205 | 0.6 |

* according to Eisenhut, Melliand Textil Berichte XXII, pages 424–426 (1941).

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a wash or cleaning composition which includes a surface active agent and at least one builder compound, the improvement in which the builder compound comprises a linear or cross-linked polymer or salt thereof which polymer in the main chain has predominantly carbon-to-carbon bonds and wherein the units predominantly have the formula

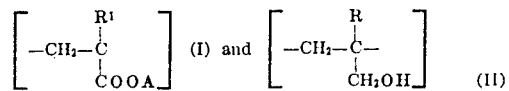

and wherein a minor amount, relative to the amount of units (I) and (II), of units of the type

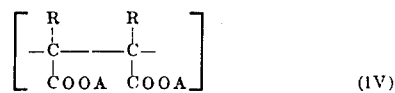

may be present and wherein R and $R^1$ are the same or different and are alkyl having 1 to 6 carbon atoms or hydrogen and wherein $R^1$ may also be chlorine and wherein A is hydrogen or one valence of a monovalent or polyvalent metal or is ammonium, the said units I, II and IV being arranged in random sequence and the average frequency of the units being such as to provide for a ratio of carboxyl or carboxylate groups to hydroxyl groups between 1.1 and 16 and the minimum degree of polymerization being 3, the said polymers being obtained by oxidative polymerization of acrolein or oxidative copolymerization of (a) acrolein with (b) acrylic acid, an alkyl acrylic acid, a halogenoacrylic acid or an unsaturated polycarboxylic acid.

2. The composition of claim 1, wherein the ratio of carboxyl or carboxylate groups is between 2 and 9.

3. The composition of claim 1, wherein the degree of polymerization is between 3 and 600.

4. The composition of claim 1, wherein A is an alkali metal.

5. The composition of claim 4, wherein A is sodium.

6. The composition of claim 1, which additionally includes units of the formulae

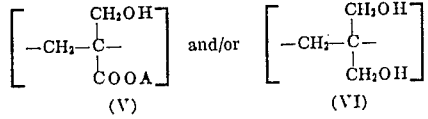

in a minor number relative to the number of units I and II, A in formulae V having the meaning as in claim 1.

7. The composition of claim 1, wherein R, $R^1$, or both, are methyl.

8. The composition of claim 1, which includes side chains of vinyl or carbonyl groups in a minor number relative to the number of units I and II.

9. The composition of claim 1 which has the following composition: 1 – 80 weight percent of a surface action agent and 99 – 80 weight percent of a builder material comprising at least in part a polymer as defined in claim 1.

10. The composition of claim 1 wherein said builder material consists of 90 – 10 weight percent of the polymer defined in claim 1 and 10 – 90 percent of a builder compound other than said polymer of claim 1.

11. The composition of claim 1 wherein said surface action agent consists at the least 50 percent by weight of anionic surfactants of the sulfonate or sulfate type and soap.

12. The composition of claim 1 wherein the total builder compound is present in an amount of 0.5 – 7 times the total amount of said surface action agent.

13. A washing and cleaning composition according to claim 1 wherein the builder compound contains sufficient alkali to cause a 1 percent solution of the composition in water to have a pH in the range of 8 – 12.

14. The composition of claim 1 which additionally includes a non-surface foaming action inhibitor.

* * * * *